(12) United States Patent
Suzuki et al.

(10) Patent No.: US 8,192,081 B2
(45) Date of Patent: Jun. 5, 2012

(54) TEMPERATURE SENSOR

(75) Inventors: Tatsuya Suzuki, Nagoya (JP); Mitsunori Oi, Kasugai (JP); Takashi Maeda, Kakamigahara (JP); Norimichi Saito, Niwa-gun (JP); Toshinori Nishi, Komaki (JP); Go Hanzawa, Kitanagoya (JP); Takeshi Morita, Kitanagoya (JP)

(73) Assignee: NGK Spark Plug Co., Ltd., Aichi (JP)

( * ) Notice: Subject to any disclaimer, the term of this patent is extended or adjusted under 35 U.S.C. 154(b) by 353 days.

(21) Appl. No.: 12/437,614

(22) Filed: May 8, 2009

(65) Prior Publication Data

US 2009/0279585 A1    Nov. 12, 2009

(30) Foreign Application Priority Data

May 9, 2008    (JP) ................................. 2008-123024
Apr. 22, 2009    (JP) ................................. 2009-104434

(51) Int. Cl.
     *G01K 7/16*      (2006.01)
     *G01K 1/08*      (2006.01)
     *G01K 1/14*      (2006.01)

(52) U.S. Cl. ......... 374/163; 374/185; 374/208; 374/144

(58) Field of Classification Search .................. 374/163, 374/183, 179, 208, 100, 141, 144, 185; 136/200; 73/866.5
See application file for complete search history.

(56) References Cited

U.S. PATENT DOCUMENTS

| | | | | |
|---|---|---|---|---|
| 4,018,624 A | * | 4/1977 | Rizzolo | 136/233 |
| 4,453,835 A | * | 6/1984 | Clawson et al. | 374/185 |
| 4,485,263 A | * | 11/1984 | Itoyama et al. | 136/230 |
| 5,662,418 A | * | 9/1997 | Deak et al. | 374/144 |
| RE35,674 E | * | 12/1997 | Pustell | 136/231 |
| 5,917,145 A | | 6/1999 | Parent et al. | |
| 6,264,363 B1 | | 7/2001 | Takahashi et al. | |
| 6,466,123 B1 | | 10/2002 | Kuzuoka et al. | |
| 6,536,950 B1 | * | 3/2003 | Green et al. | 374/179 |
| 6,762,671 B2 | * | 7/2004 | Nelson | 338/25 |
| 6,899,457 B2 | * | 5/2005 | Kurano | 374/185 |
| 7,060,949 B1 | * | 6/2006 | Davis et al. | 219/536 |
| 7,458,718 B2 | * | 12/2008 | Krishnamurthy et al. | 374/208 |
| 7,740,403 B2 | * | 6/2010 | Irrgang et al. | 374/185 |
| 2004/0101028 A1 | * | 5/2004 | Iwaya et al. | 374/163 |
| 2006/0013282 A1 | * | 1/2006 | Hanzawa et al. | 374/163 |
| 2007/0261473 A1 | | 11/2007 | Weyl et al. | |
| 2009/0064663 A1 | * | 3/2009 | Ma et al. | 60/277 |

FOREIGN PATENT DOCUMENTS

| | | |
|---|---|---|
| DE | 10 2004 033 958 A1 | 2/2006 |
| JP | 5-264368 A | 10/1993 |
| JP | 2000-097781 A | 4/2000 |

* cited by examiner

*Primary Examiner* — Gail Verbitsky (74) *Attorney, Agent, or Firm* — Sughrue Mion, PLLC (57) ABSTRACT

A temperature sensor including: a temperature sensing element (102) having a temperature sensing unit (103) and a pair of device electrode wires (104); a sheath member (106) having a sheath wire (108) connected at a junction (110) to at least one of the device electrode wires and a sheath outer pipe (107) retaining the sheath wire in an insulating material (114); an inner tube (112) which has a bottomed cylindrical shape; and a cylindrical outer tube (120) having an open end, covering the inner tube such that the open end is located at a front end side of the junction and in a region to the rear end side of or aligned with the front end of the inner tube, and being spaced from the inner tube at the front end side of the junction.

6 Claims, 7 Drawing Sheets

TEMPERATURE SENSOR

BACKGROUND OF THE INVENTION

1. Field of the Invention

The present invention relates to a temperature sensor having a temperature sensing element such as a thermistor and a Pt resistance thermometer.

2. Description of the Related Art

As a temperature sensor for detecting the temperature of exhaust gas of a vehicle or the like, a thermistor, a Pt resistance thermometer, or the like which exhibits a change in resistance with changing temperature has been known (refer to Patent Documents 1 and 2).

Figure 6:
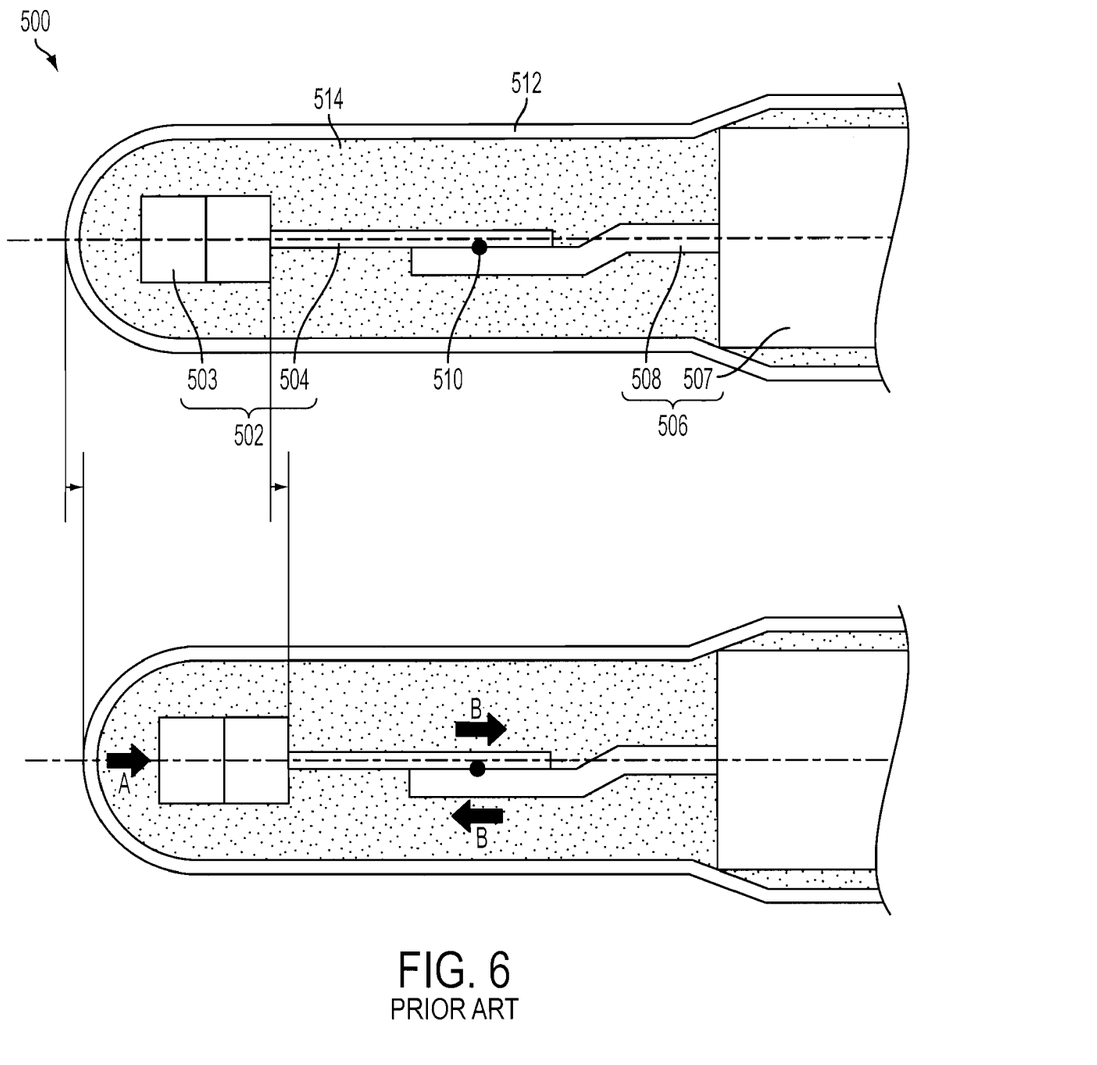
FIG. 6 is a partially enlarged view of a cross-section (upper cross-section) of a related art temperature sensor and a lower cross-section showing contraction of inner tube 512 upon cooling.

A configuration of this type of temperature sensor is illustrated in FIG. 6. As illustrated in the upper cross section of FIG. 6, temperature sensor 500 is configured by welding and accommodating a thermistor 502 and a sheath member 506 in a metal tube 512, and filling the metal tube 512 with a cement 514 such as alumina through a gap in the metal tube 512.

The thermistor 502 includes a thermistor sintered body 503 and a device electrode wire 504. Since the device electrode wire 504 is a Pt—Rh wire or the like which is expensive, a low-cost sheath member 506 is connected thereto so as to reduce cost. Here, the sheath member 506 includes an insulated sheath wire 508 made of SUS and the like retained by a sheath tube 507. Further, the device electrode wire 504 and the sheath wire 508 are joined at a junction 510 by laser spot welding.

[Patent Document 1] JP-A-Hei 5-264368 (FIG. 1, Paragraph 0010)
[Patent Document 2] JP-A-2000-97781

3. Problems to be Solved by the Invention

However, the temperature of the exhaust gas changes rapidly between a low temperature of about 0° C. and a high temperature of about 1000° C., and accordingly the temperature sensor is also subjected to a thermal cycle of raising/decreasing the temperature within a temperature range.

In addition, when the temperature sensor is rapidly cooled from a high temperature to a low temperature, cooling starts from the metal tube 512 on an outer periphery side. Here, the metal tube 512 such as stainless steel has a thermal expansion coefficient greater than that of the inside cement (alumina or the like) 514. Accordingly, as illustrated in FIG. 6 (lower cross section), when the metal tube 512 starts cooling and contracts, contraction of the cement 514 cannot follow that of the metal tube 512, and a leading end portion (on a side of the thermistor 502) of the metal tube 512 presses the adjacent cement 514 and the thermistor 502 rearward (along an arrow A). When the thermistor 502 is pressed rearward (on a side of the sheath member) as described above, a shear stress as shown by arrows B is exerted on the junction 510 of the device electrode wire 504 and the sheath wire 508. In addition, whenever the thermal cycle is repeated, the shear stress is exerted on the junction 510, the strength of the junction 510 is reduced, and there is a concern that a break in the junction 510 may occur.

In addition, a sensor disclosed in Patent Document 1 has a configuration in which a thermistor is accommodated in a double tube having an inner pipe 4 and a metal tube 5. In this case, leading ends of the inner pipe 4 and the metal tube 5 are fixed by a TIG (Tungsten Inert Gas) welding portion 15, so that the entire tube also contracts and the thermistor is pressed rearward.

SUMMARY OF THE INVENTION

It is therefore an object of the present invention to provide a temperature sensor capable of lessening the stress exerted on a junction of a device electrode wire and a sheath wire of a temperature sensing element.

According to a first aspect (1), the above object of the invention has been achieved by providing a temperature sensor including: a temperature sensing element having a temperature sensing unit and a pair of device electrode wires extending from the temperature sensing unit; a sheath member including a sheath wire connected at a junction to at least one of the device electrode wires and a sheath outer pipe retaining the sheath wire in an insulating material; an inner tube made of a metal which has a bottomed cylindrical shape, said inner tube accommodating the temperature sensing element and the junction in a bottom portion side of the inner tube serving as a front end of the temperature sensor, and extending in an extension direction of the device electrode wire and the sheath wire; and a cylindrical outer tube having an open end, when viewed in a direction perpendicular to an axial direction of the inner tube, said outer tube covering the inner tube such that the open end is located at a front end side of the junction and in a region to the rear end side of or aligned with the front end of the inner tube, and being spaced from the inner tube at the front end side of the junction.

With such a configuration, the front end of the inner tube is exposed at the open end of the outer tube, and the junction is always shielded by the outer tube. Accordingly, when the temperature sensor is rapidly cooled from a high temperature to a low temperature, cooling starts from an outer periphery side of the outer tube, and the outer tube contracts. However, the inner tube resists the rapid temperature change because it is shielded by the outer tube. In addition, since the outer tube is spaced from the inner tube at a front end side of the junction, the contraction of the outer tube due to the rapid temperature change is not followed by that of the inner tube, and the degree of contraction of the inner tube can be reduced. Particularly, since the junction is shielded by the outer tube, stress such as shear stress exerted on the junction due to contraction of the inner tube with changing temperature can be lessened.

In addition, since the front end of the inner tube is exposed at the open end of the outer tube, the front end is exposed to the gas to be measured. Thus, the temperature of the gas to be measured can be measured with good precision without deteriorating respondence of the temperature sensing unit included in the front end.

In addition, since the junction is shielded by the outer tube, the temperature change in the vicinity of the junction can be smoothened, so that thermal stress exerted on the junction can be reduced, thereby further enhancing reliability of the temperature sensor.

In a preferred embodiment (2), the temperature sensor according to (1) above further comprises a fixing portion for fixing the outer tube to the inner tube or the sheath outer pipe at a rear end side of the junction when viewed in a direction perpendicular to the axial direction of the inner tube.

With such a configuration, the outer tube can be fixed at the rear end side of the junction, and contraction of the inner tube following contraction of the outer tube due to a rapid temperature change can be effectively prevented.

In another preferred embodiment (3) of the temperature sensor according to (1) or (2) above, the open end is located at the front end side of a rear end of the temperature sensing unit when viewed in a direction perpendicular to the axial direction of the inner tube.

With such a configuration, the outer tube covers the device electrode wire close to the junction on which stress such as shear stress is exerted due to contraction with changing temperature, so that the stress exerted on the junction can Her be lessened.

In yet another preferred embodiment (4) of the temperature sensor according to any of (1) to (3) above, the open end is located at the rear end side of a front end of the temperature sensing unit when viewed from a direction perpendicular to the axial direction of the inner tube.

With such a configuration, the inner tube in the vicinity of the temperature sensing unit is always exposed to the gas to be measured. Therefore, the respondence of the included temperature sensing unit is further enhanced, and precision of the temperature measurement of the gas to be measured can further be increased.

In yet another preferred embodiment (5) of the temperature sensor according to any one of (1) to (4) above, the insulating material is filled between the temperature sensing element and an inner surface of the inner tube.

With such a configuration, heat is rapidly transferred from the inner tube to the temperature sensing element, thereby further enhancing the respondence of the temperature sensing element.

In yet another preferred embodiment (6) of the temperature sensor according to any of (1) to (5) above, in a portion where the inner tube and the outer tube are separated at a front side of the junction, when a maximum outer diameter of the inner tube is defined as $\phi 1$ and a minimum inner diameter of the outer tube is defined as $\phi 2$, the relationship $\phi 1 < \phi 2 \leqq 2 \times \phi 1$ is satisfied.

By having such configuration, the inner tube and the outer tube can be securely separated at a front side of the junction, and the outer tube can effectively shield the junction. On the one hand, since the outer tube is not much larger than the inner tube (an inner diameter of the outer tube is not more than two times an outer diameter of the inner tube at the most), the possibility of lowering the shielding effect is reduced. Further, a crimping defect or the like upon attaching the outer tube by crimping or the like is not likely to occur, thereby improving productivity or assembly accuracy.

Thus, in accordance with the invention, the stress exerted on the junction of the device electrode wire of the temperature sensing element and the sheath wire can be lessened, and a break in the junction can be prevented.

BRIEF DESCRIPTION OF THE DRAWINGS

Illustrative aspects of the invention will next be described in detail with reference to the following figures wherein.

DETAILED DESCRIPTION OF EXEMPLARY EMBODIMENTS OF THE PRESENT INVENTION

Hereinafter, exemplary embodiments of the invention will be described with reference to the drawings. However, the present invention should not be construed as being limited thereto.

Figure 1:
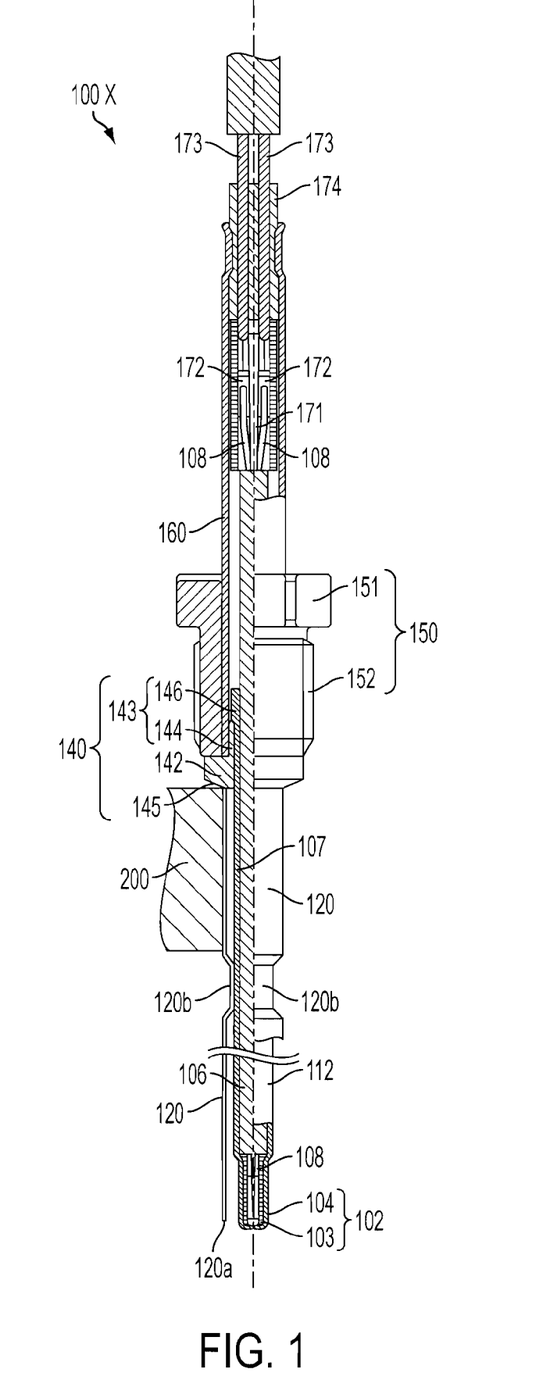
FIG. 1 is a cross-sectional view illustrating a configuration of a temperature sensor that is partially cut away, according to a first embodiment of the invention.

FIG. 1 illustrates a cross-sectional configuration of a temperature sensor $100x$ that is partially cut away, according to a first embodiment of the invention. The temperature sensor $100x$ is inserted through an opening of a side wall 200 of an exhaust pipe to be mounted therein, and detects the temperature of a vehicle exhaust gas. In addition, as the temperature of the exhaust gas changes rapidly between a low temperature of about 0° C. and a high temperature of about 1000° C., a thermal cycle of raising/decreasing the temperature within a temperature range is applied to the temperature sensor $100x$.

The temperature sensor $100x$ includes a thermistor (temperature sensing element) 102, a sheath member 106 connected to the thermistor 102, an inner tube 112 made of a metal (SUS310S is used in this embodiment) which has a bottomed cylindrical shape accommodating the thermistor 102 and the sheath member 106, an outer tube 120 made of a metal (SUS310S is used in this embodiment) which is aligned coaxially with the inner tube 112 and has a cylindrical shape covering the inner tube 112, a flange member 140 fitted to an outer periphery of the inner tube 112, a mounting member 150 loosely fitted to an outer periphery of the flange member 140, a cylindrical joint 160 made of a metal which is mounted to a rear end side of the flange member 140, and an elastic seal member 174 which is mounted to a rear end of the joint 160 to pull out a lead 173.

In the temperature sensor $100x$ of this embodiment, a lower end side of the inner tube 112 is referred to as a "leading end" or "front end", and an open end side of the inner tube 112 is referred to as a "rear side".

The thermistor (temperature sensing device) 102 includes a thermistor sintered body (temperature sensing unit) 103 for measuring temperature and a pair of device electrode wires 104 extending from an end (rear end side) of the thermistor sintered body 103.

The thermistor sintered body 103 has a hexagonal prism shape provided in the inner tube 112, while an axial direction of the prism is perpendicular to an axial direction of the inner tube 112. As the thermistor sintered body 103, a perovskite-structured oxide having $(Sr,Y)(Al,Mn,Fe)O_3$ as a base composition may be used, but is not limited thereto. In addition, as the temperature sensing unit, a resistance thermometer such as Pt in addition to the thermistor may be used.

The sheath member 106 includes a sheath core 108 connected to each of the pair of device electrode wires 104 of the thermistor 102, and a sheath outer pipe 107 accommodating the sheath wire 108. An insulating material made of $SiO_2$ is filled between the sheath wire 108 and an inner surface of the sheath outer pipe 107.

Typically, the device electrode wire 504 is a Pt—Rh wire or the like that is expensive. Therefore, by connecting a sheath wire 508 made of SUS or the like which is inexpensive, a reduction in cost can be achieved.

The flange member 140 has a substantially cylindrical shape in which a center hole through which the inner tube 112 is to be inserted opens in an axial direction. From the leading end side of the temperature sensor 100x, a flange portion 142 having a large diameter, a tubular sheathing portion 143 having a smaller diameter than the flange portion 142, a first stepped portion 144 defining a leading end side of the sheathing portion 143, and a second stepped portion 146 which defines a rear end side of the sheathing portion 143 and has a smaller diameter than the first stepped portion 144, are sequentially formed. A leading end surface of the flange portion 142 is provided with a tapered seating surface 145, and when the mounting member 150 described below is screwed to the exhaust pipe, the seating surface 145 is mounted to the side wall 200 of the exhaust pipe for sealing.

The flange member 140 is press-fitted to a rear end portion of the inner tube 112, and the entire periphery of the second stepped portion 146 and the inner tube 112 are fixed to each other by laser welding.

In addition, the joint 160 is press-fitted to an outer periphery of the first stepped portion 144, and the two are fixed to each other by laser-welding the entire periphery. The joint 160 accommodates and retains a connection portion of the sheath wire 108 pulled from the sheath member 106, and the lead 173.

The mounting member 150 has a center hole with a diameter slightly larger than the outer periphery of the joint 160 in an axial direction and is provided with a screw portion 152 and a hexagonal nut portion 151 with a diameter larger than that of the screw portion 152, from a leading end side. In addition, while a rear surface of the flange portion 142 of the flange member 140 comes in contact with a front surface of the screw portion 152, the mounting member 150 is loosely fitted to the outer periphery of the flange member 140 (the joint 160) to be rotatable in the axial direction.

In addition, by screwing the screw portion 152 to a predetermined screw hole of the exhaust pipe, the temperature sensor 100x is mounted to the side wall 200 of the exhaust pipe.

The outer tube 120 has a cylindrical shape such that both ends open and the outer tube 120 covers the inner tube 112. The outer tube 120 is crimped at a substantially center position of a portion of the inner tube 112 disposed on a front end side of the flange member 140 to form a crimping portion (fixing portion) 120b and so as to be fixed to the inner tube 112. A front end 120a of the outer tube 120 is disposed slightly rearward from a front end of the inner tube 112, and a rear end of the outer tube 120 extends to a position substantially contacting the seating surface 145 of the flange portion 142.

In addition, an opening diameter of the side wall 200 of the exhaust pipe is slightly larger than that of an outside diameter of the outer tube 120 such that the outer tube 120 can be accommodated in the opening of the side wall 200.

From a rear end of the sheath outer pipe 107 of the sheath member 106, the two sheath wires 108 are pulled, and an end of each sheath wire 108 is connected to a tightening terminal 172. The tightening terminal 172 is connected to the lead 173. In addition, each of the sheath wires 108 and the tightening terminal 172 is insulated by an insulating tube 171.

In addition, each lead 173 is pulled out through a lead insertion hole of the elastic seal member 174 fitted to a rear end inner side of the joint 160 and connected to an external circuit through a connector.

Next, the outer tube 120 is described with reference to FIG. 2 that is a partially enlarged view of FIG. 1. In addition, FIG. 2 illustrates a cross-section taken in an axial direction of the temperature sensor to include one of the two device electrode wires.

Figure 2:
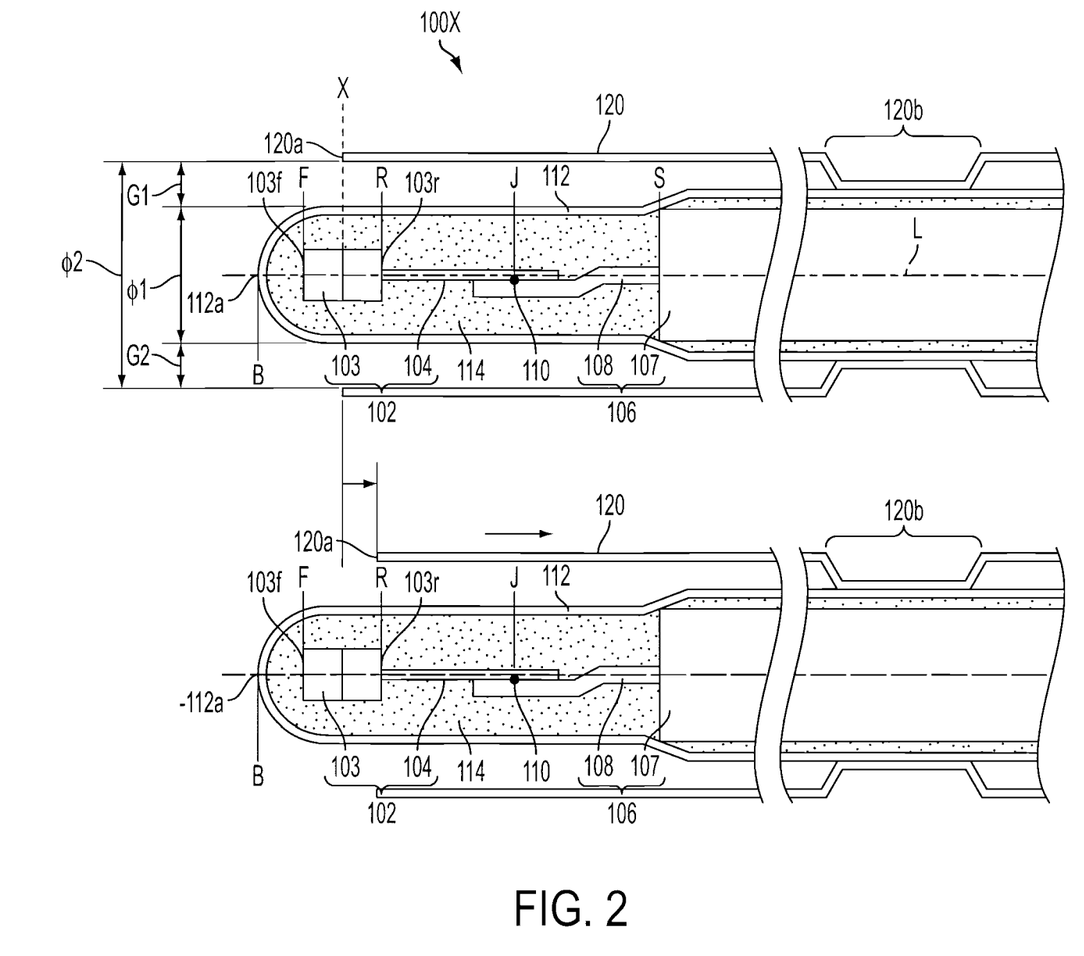
FIG. 2 is a partially enlarged view of FIG. 1 (upper cross-section), and a lower cross-section showing contraction of outer tube 120 upon cooling.

In FIG. 2, the thermistor 102 is disposed in an internal space of a bottom portion (leading end side) of the inner tube 112, and the device electrode wire 104 extends from a rear end 103r of the thermistor sintered body 103 along the axial direction L of the inner tube 112. In addition, the sheath outer pipe 107 of the sheath member 106 is accommodated in the inner tube 112 coaxially with the inner tube 112, and the sheath wire 108 pulled from a leading end of the sheath outer pipe 107 of the sheath member 106 overlaps with a leading end of the device electrode wire 104.

In addition, an overlapping portion of the device electrode wire 104 and the sheath wire 108 is formed as a junction 110 by laser spot welding, and the two are joined at the junction 110. The thermistor 102 and the sheath member 106 are connected as described above to be accommodated in the inner tube 112, and the insulating material 114 fills a space, so that the thermistor 102 and the sheath member 106 are retained in the inner tube 112. The insulating material 114 may be formed by filling and solidifying an unconsolidated cement having alumina and silica as a main constituent and an aggregate, respectively, in the space.

Here, when viewed in a direction perpendicular to the axial direction L of the inner tube 112, a front end of the junction 110 is denoted by J, a position of the rear end 103r of the thermistor sintered body 103 is denoted by K, a position of a front end 103f of the thermistor sintered body 103 is denoted by F, and a position of a front end 112a of the inner tube 112 is denoted by B. In addition, the front end 112a position B) of the inner tube 112 corresponds to "the bottom portion of the inner tube" of the claims appended hereto. Also, "the region of the bottom portion of the inner tube" means the region to a rear end side of the position B (including a position the same as (aligned with) the position B) when viewed in the direction perpendicular to the axial direction L.

Here, a position X of the front end (open end) 120a of the outer tube 120 is at a front end side of the position J and at a rear end side of the position B (in the region of the bottom portion of the inner tube). In addition, the outer tube 120 is spaced from the inner tube 112 at the front end side of the position J.

When the outer tube 120 is configured as described above, the front end 112a of the inner tube 112 is exposed from the open end 120a of the outer tube 120, and the junction 110 is shielded by the outer tube 120. Accordingly, when the temperature sensor 100x is cooled from a high temperature to a low temperature, cooling starts from the outer tube 120 on an outer periphery side, and the outer tube 120 contracts as illustrated in layer FIG. 2. However, the rapid temperature change is not readily transferred to the inner tube 112 shielded by the outer tube 120. In addition, since the outer tube 120 is spaced from the inner tube 112 at the front end side of the junction 110, the contraction of the outer tube 120 due to the rapid temperature change is not followed by the inner tube 112, and the degree of the contraction of the inner tube 112 can be reduced. Particularly, since the junction 110 (position J) is shielded by the outer tube 120, stress such as shear stress exerted on the junction 110 which is caused by the contraction of the inner tube 112 with a change in temperature can be lessened.

addition, since the front end 112a of the inner tube 112 is exposed at the open end of the outer tube 120, the front end 112a is exposed to the exhaust gas, respondence of the thermistor sintered body (temperature sensing unit) 103 housed in the front end 112a is not deteriorated, and the temperature of the exhaust gas can be measured with good precision. In addition, in this embodiment of the invention, the description that "position X is at a rear end side of the position B" includes the case where position X and position B are flush with each other. This is because the front end 112a can be exposed to the exhaust gas by the flow of the exhaust gas when the two are flush with each other.

Moreover, since the junction 110 is shielded by the outer tube 120, the temperature change in the vicinity of the junction 110 can be smoothened, and thermal stress exerted on the junction 110 can be reduced, thereby further enhancing reliability of the temperature sensor.

In addition, in this embodiment, the outer tube 120 is exemplified as having an outside diameter of 4.45 mm and a thickness of 0.3 mm, and the inner tube 112 is exemplified as having an outside diameter of 2.65 mm. In this case, a distance from the outer tube 120 to the inner tube 112 is 0.6 mm.

Further, in this embodiment, in a portion where the inner tube 112 and the outer tube 120 are separated on a front side from the junction 110, when a maximum outer diameter of the inner tube is defined as $\phi1$ and a minimum inner diameter of the outer tube is defined as $\phi2$, the relationship $\phi1<\phi2\leqq2\times\phi1$ is satisfied.

By having such a configuration, the inner tube 112 and the outer tube 120 can be securely separated on a front side from the junction 110, and the junction 110 is effectively shielded by the outer tube 120. On the one hand, since the outer tube 120 is not much larger than the inner tube 112 (an inner diameter of the outer tube 120 is not more than two times an outer diameter of the inner tube 112 at the most), the possibility of lowering the shielding effect is reduced. Further, a crimping defect or the like upon attaching the outer tube by crimping or the like is not likely to occur, thereby improving productivity or assembly accuracy.

Further, in a cross-section of FIG. 2, a gap G1 is formed between an upper surface of the inner tube 112 and the outer tube 120, and a gap G2 is formed between a lower surface of the inner tube 112 and the outer tube 120. In this case, the relationship $\phi2-\phi1=G1+G2$ is satisfied.

In a case where a cross-section of the outer tube is not circular (for example, in the case of an elliptical shape), two times a shortest distance among distances from a center of the outer tube to an inner surface of the outer tube in an outward radial direction is defined as $\phi2$. Similarly, in the case where the cross-section of the inner tube is not circular (for example, in the case of an elliptical shape), two times a longest distance among distances from a center of the inner tube to an outer surface of the inner tube in an outward radial direction is defined as $\phi1$.

Furthermore, $\phi1$ and $\phi2$ target a portion reaching a front end of the outer tube 120 at a front end side of the junction 110. For example, in the case where the outer tube 120 is tapered toward the front end, an inner diameter of the outer tube 120 at the front end is taken as $\phi2$.

In addition, in his embodiment the outer tube 120 is fixed to the inner tube 112 by the crimping portion 120b at a rear end side of the position J. When a fixing position of the inner tube 112 and the outer tube 120 is at a rear end side of the position J, the contraction of the inner tube 112 following the contraction of the outer tube 120 due to the rapid temperature change can be effectively prevented. Particularly, the fixing position of the inner tube 112 and the outer tube 120 is more preferably at a rear end side of the position S.

in addition, the rear end of the outer tube 120 preferably extends at least to a rear end (position S) of the sheath wire 108 (where the sheath wire 108 is taken out of the front end of the sheath outer pipe 107) extending from the junction.

In addition, when the position X is at a front end side of the position R, the outer tube 120 covers the device electrode wire 104 close to the junction 110 on which shear stress is exerted due to contraction with a change in temperature. Consequently, the stress exerted on the junction 110 can be further lessened.

In addition, when the position X is at a rear end side of the position F, the inner tube 112 in the vicinity of the thermistor sintered body (temperature sensing unit) 103 is always exposed to the exhaust gas. Therefore, the respondence of the thermistor sintered body (temperature sensing unit) 103 is further enhanced, and precision of the temperature measurement of the exhaust gas can be her increased.

In addition, in this embodiment, the insulating material 114 fills the space between the thermistor sintered body (temperature sensing unit) 103 and the inner tube 112, and the thermistor sintered body 103 and the inner tube 112 are formed integrally with each other. Accordingly, the extent of pressing the thermistor sintered body 103 to the rear side (sheath member side) when the inner tube 112 contracts with a change in temperature is increased, so as to exhibit the significant effects of this embodiment of the invention. In addition, when the insulating member fills the space between the thermistor sintered body 103 and the inner tube 112, heat is rapidly transferred from the inner tube 112 to the thermistor sintered body 103, thereby further enhancing the respondence of the thermistor sintered body 103.

Various configurations for retaining the thermistor sintered body 103 in the inner tube 112 include, in addition to the above-mentioned filling of the insulating material, a retaining configuration for retaining the thermistor sintered body 103 by disposing a holder in the vicinity of the thermistor sintered body 103 and filling the holder with an insulating material, a retaining configuration of allowing the thermistor sintered body 103 to come in contact with (be adhered to, or the like) a leading end inner wall or a side wall of the inner tube 112, or the like. In this embodiment of the invention, the above-mentioned retaining configuration is employed.

Figure 3:
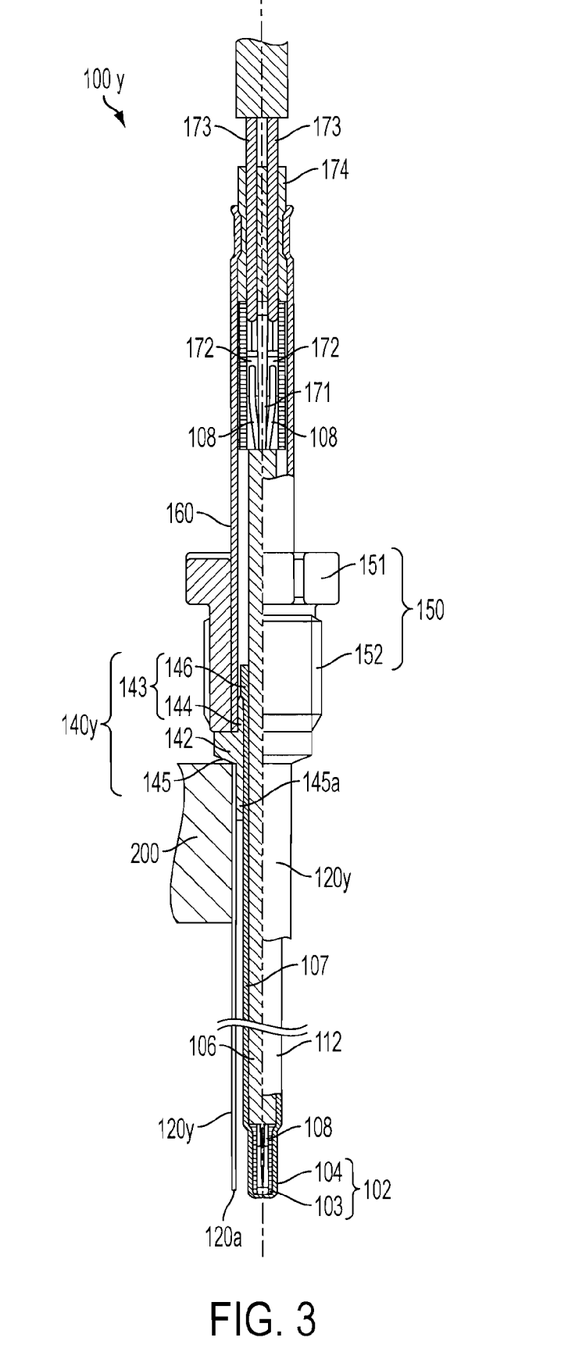
FIG. 3 is a cross-sectional view illustrating a configuration of a temperature sensor that is partially cut away, according to a second embodiment of the invention.

Next, a temperature sensor 100y according to a second embodiment of the invention will be described with reference to FIG. 3. FIG. 3 illustrates a cross-sectional configuration of the temperature sensor 100y that is partially cut away. The temperature sensor 100y is the same as that of the first embodiment, except that configurations of a flange member 140y and an outer tube 120y are different from those of the first embodiment. Like elements in the first embodiment are denoted by like reference numerals, and a detailed description thereof will be omitted.

The temperature sensor 100y is different from that of the first embodiment in that the outer tube 120y is not fixed by crimping to the inner tube 112, but rather by means of the flange member 140y. Specifically, a cylindrical guide portion 145a extends from the seating surface 145 formed on the front end surface of the flange portion 142 of the flange member 140y toward the front end side. The guide portion 145a has a center hole provided coaxially with the flange member 140y, and an outside diameter of the guide portion 145a is slightly larger than an inside diameter of the outer tube 120y.

Figure 4A:
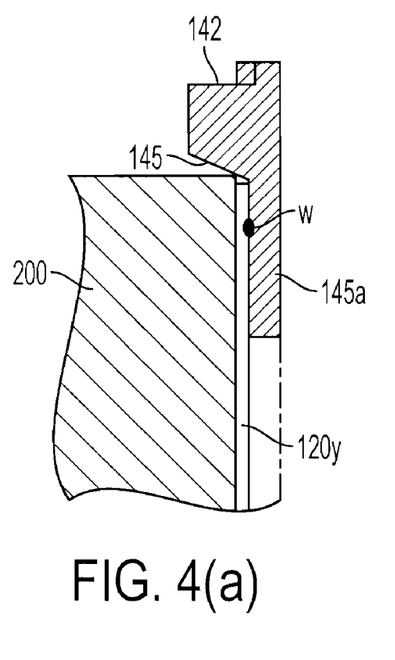
FIGS. 4(a) and 4(b) are partial cross-sectional views illustrating a fixed state of an outer tube in the temperature sensor according to a second embodiment of the invention.

In addition, as illustrated in FIG. 4, when the outer tube 120y is insert-fitted to the guide portion 145a and welded thereto, the outer tube 120y is fixed to the guide portion 145a with a welding portion w (FIG. 4(a)). The temperature sensor 100y configured as described above is mounted to the side wall 200 (of the exhaust pipe).

Figure 4B:
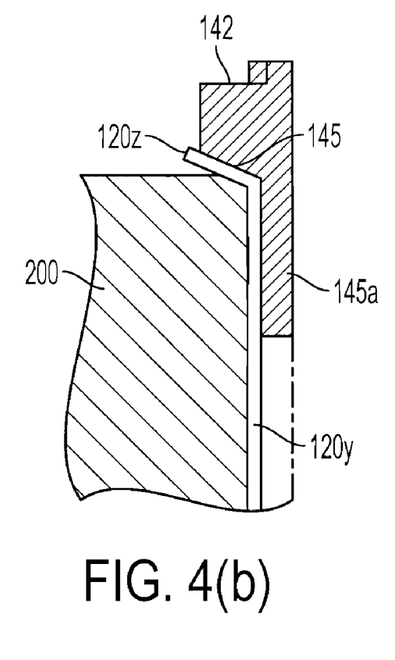

In addition, as a method of fixing the outer tube without welding, as illustrated in FIG. 4(b), a flange portion 120z is provided by increasing a diameter of a rear end of the outer tube 120y such that the rear end is along the seating surface 145. In this case, when the temperature sensor 100y is inserted into the side wall 200 (of the exhaust pipe) after insert-fitting the outer tube 120y to the guide portion 145a, the flange portion 120z is fitted and retained between the seating surface 145 and the side wall 200.

In addition, in the second embodiment illustrated in FIG. 4(a), the guide portion 145a serves as the fixing portion of the outer tube. In the second embodiment illustrated in FIG. 4(b), the seating surface 145 serves as the fixing portion of the outer tube, and when the temperature sensor 100y is mounted to an object, the seating surface 145 functions as the fixing portion.

Figure 5:
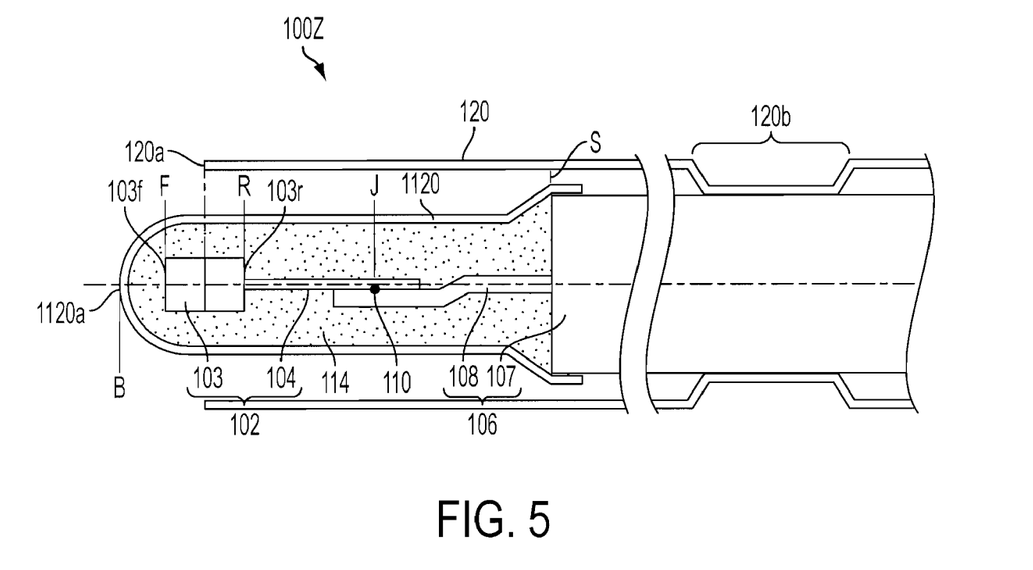
FIG. 5 is a partially enlarged view of a cross-section of a temperature sensor according to a third embodiment of the invention.

Next, a temperature sensor 100z according to a third embodiment of the invention will be described with reference to FIG. 5. FIG. 5 is a partially enlarged view corresponding to FIG. 2, and illustrates a cross-section taken in a direction parallel with an axial direction of the temperature sensor 100z to include one of the two device electrode wires 104. The temperature sensor 100z is the same as that of the first embodiment, except that a configuration of the inner tube 1120 is different. Like elements in the first embodiment are denoted by like reference numerals, and a detailed description thereof will be omitted. In addition, a configuration of parts not shown in FIG. 5 is the same as that in FIG. 1.

In the temperature sensor 100z, the inner tube 1120 covers a region from the thermistor 102 to the position S, and the entire periphery thereof is laser-welded to the leading end of the sheath outer pipe 107 in the vicinity of the position S. In this manner, the inner tube 1120 is not present on a rear end side from the welding position so as to expose the sheath outer pipe 107. In addition, the outer tube 120 is crimped (crimped portion 120b) and fixed to the sheath outer pipe 107. Moreover, a rear end side of the sheath member 106 is inserted through the center hole of the flange member 140 and retained by the flange member 140.

The invention is not limited to the above embodiments, and various changes in form and detail of the invention as shown and described above can be made without departing from the spirit and scope of the claims appended hereto. For example, the material of the outer tube is not particularly limited, and various types of heat-resistant materials such as ceramics may be used in addition to the metal.

EXAMPLES

A temperature sensor having a structure shown in FIG. 1, was manufactured, including an inner tube 112 having an outer diameter of 2.65 mm, and an outer tube 120 having a diameter which differed so that a gap (value of (G1+G2)/2 of FIG. 2) between the outer tube 120 and the inner tube 112 assumed the values shown in Table 1.

This temperature sensor was mounted in a predetermined chamber and air heated at 800° C. was blown into the chamber from an external burner for 5 minutes. Then, the burner was deactivated and room temperature air was blown into the chamber for 1 minute to carry out cooling. This heating and cooling were taken as 1 cycle, and the temperature sensor in the chamber was subjected to thermal cycling for the number of cycles shown in Table 1 to establish a thermal history. During the thermal cycling, the chamber was vibrated while sweeping at a frequency ranging from 150 Hz to 3000 Hz.

After completing the test, the temperature sensor was disassembled, and visually evaluated to determine whether breakage occurred at a welded portion of the junction 110. The results thus obtained are shown in Table 1.

TABLE 1

| Outer tube | Gap between outer tube and inner tube (mm) | Maximum outer diameter of inner tube φ1 (mm) | Minimum inner diameter of outer tube φ2 (mm) | φ2/φ1 | Number of Thermal Cycles | State of junction |
|---|---|---|---|---|---|---|
| Absent | — | 2.65 | — | — | 1300 | X |
|  | — | 2.65 | — | — | 2000 | X |
|  | — | 2.65 | — | — | 1600 | X |
| Present | 0.6 | 2.65 | 3.85 | 1.45 | 4000 | ○ |
|  | 0.6 | 2.65 | 3.85 | 1.45 | 3500 | ○ |
|  | 1.3 | 2.65 | 5.25 | 1.98 | 3500 | ○ |

As is apparent from Table 1, it was found that, in the case where an outer tube was provided, the welded portion of the junction was not broken (O) even though the temperature sensor was subjected to thermal cycling applied under vibration, and stress to the junction was relieved.

On the other hand, it was found that, in the case where an outer tube was not provided, the welded portion of the junction was broken (X) when the temperature sensor was subjected to thermal cycling under vibration, and stress to the junction could not be relieved.

Next, the various temperature sensors (sensors without an outer tube, and sensors of φ2/φ1=1.45 or 1.98) shown in Table 1 were mounted to a pipe located downstream of an electric furnace (ambient atmosphere) of 600° C., and the temperature was measured at a flow rate of 20 m/s in the pipe. Here, temperature sensors prior to being subjected to thermal cycling were employed.

Figure 7:
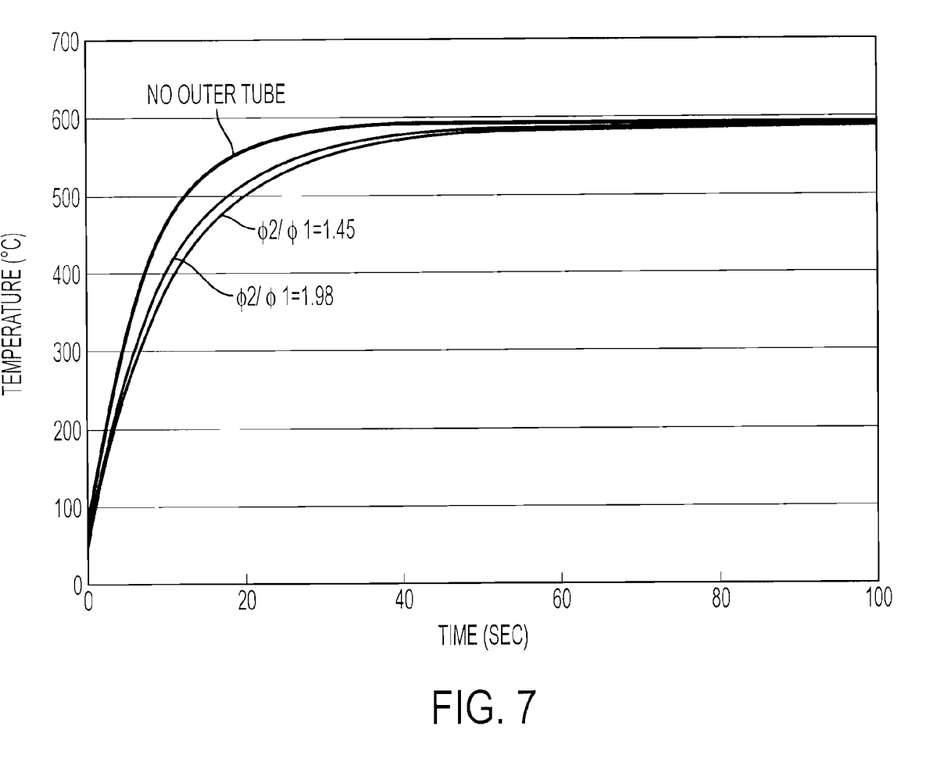
FIG. 7 is a view illustrating respondences of the temperature sensing part of a temperature sensor, both without and with an outer tube.

Values of temperature measurement by the respective temperature sensors with elapsed time from when warm air first flowed in the pipe from the electric furnace are shown in FIG. 7. The curves in FIG. 7 represent responsiveness of a temperature sensing part built in the front end of the temperature sensor, and the responsiveness is evaluated as good if the measurement value reaches 500° C. or higher after 25 seconds from the start of measurement. The present inventors confirmed that the responsiveness was good in the range of φ2/φ1=1.45 to 1.98, similar to the case where an outer tube was not provided (that is, the case where responsiveness is highest).

This application is based on Japanese Patent Application No. 2008-123024, filed May 9, 2008 and on Japanese Patent Application No. 2009-104434 filed Apr. 22, 2009, the disclosures of which are incorporated herein by reference in their entirety.

What is claimed is:

1. A temperature sensor comprising:
   a temperature sensing element having a temperature sensing unit and a pair of device electrode wires extending from the temperature sensing unit;
   a sheath member including a sheath wire connected at a junction to at least one of the device electrode wires and a sheath outer pipe retaining the sheath wire in an insulating material;
   an inner tube made of a metal which has a cylindrical shape having a closed bottom at a front end thereof, said inner tube accommodating the temperature sensing element and the junction in the closed bottom of the inner tube serving as a front end of the temperature sensor, and extending rearward in an extension direction of the device electrode wire and the sheath wire; and
   a cylindrical outer tube having an open end, when viewed in a direction perpendicular to an axial direction of the inner tube, said outer tube covering the inner tube such that the open end is located frontward of the junction and rearward of or aligned with the front end of the inner tube, and being spaced from the inner tube at the front end side of the junction, wherein the sheath member is disposed within the inner tube, and a front end of the sheath outer pipe is rearward of the junction.

2. The temperature sensor according to claim 1, further comprising:

a fixing portion for fixing the outer tube to the inner tube or the sheath outer pipe rearward of the junction when viewed in a direction perpendicular to the axial direction of the inner tube.

3. The temperature sensor according to claim 1, wherein the open end is located frontward of a rear end of the temperature sensing unit when viewed in a direction perpendicular to the axial direction of the inner tube.

4. The temperature sensor according to claim 1, wherein the open end is located rearward of a front end of the temperature sensing unit when viewed from a direction perpendicular to the axial direction of the inner tube.

5. The temperature sensor according to claim 1, wherein the insulating material is filled between the temperature sensing element and an inner surface of the inner tube.

6. The temperature sensor according to claim 1, wherein in a portion where the inner tube and the outer tube are separated at a front side of the junction, when a maximum outer diameter of the inner tube is defined as $\phi 1$ and a minimum inner diameter of the outer tube is defined as $\phi 2$, the relationship $\phi 1 < \phi 2 \leqq 2 \times \phi 1$ is satisfied.

* * * * *